(12) United States Patent
Huang et al.

(10) Patent No.: US 11,406,943 B1
(45) Date of Patent: Aug. 9, 2022

(54) APPARATUS FOR TREATING FLUIDS HAVING IMPROVED AERATION EFFICIENCY AND DUAL FUNCTION OPERATION

(71) Applicant: Aeration Industries International, LLC, Chaska (MN)

(72) Inventors: Jing Huang, Chaska, MN (US); Raymond P. Hedelson, Minnetrista, MN (US); Sherif S. Saleh, Carver, MN (US)

( * ) Notice: Subject to any disclaimer, the term of this patent is extended or adjusted under 35 U.S.C. 154(b) by 47 days.

(21) Appl. No.: 16/902,166

(22) Filed: Jun. 15, 2020

Related U.S. Application Data

(60) Provisional application No. 62/861,442, filed on Jun. 14, 2019.

(51) Int. Cl.
| | |
|---|---|
| *B01F 3/04* | (2006.01) |
| *B01F 23/233* | (2022.01) |
| *C02F 3/20* | (2006.01) |

(52) U.S. Cl.
CPC .......... *B01F 23/2333* (2022.01); *C02F 3/207* (2013.01); *B01F 23/23362* (2022.01)

(58) Field of Classification Search
CPC ........ B01F 3/04595; B01F 2003/04673; B01F 23/2333; B01F 23/23362; B01F 23/23311; B01F 23/23312; B01F 23/23314; C02F 3/207
USPC ...................................................... 261/87, 93
See application file for complete search history.

(56) References Cited

U.S. PATENT DOCUMENTS

| | | | |
|---|---|---|---|
| 1,343,797 | A | 6/1920 | Stott et al. |
| 1,450,326 | A | 4/1923 | Maitland |
| 1,505,479 | A | 8/1924 | Maitland |
| 1,632,758 | A | 6/1927 | Fulweiler et al. |
| 1,639,828 | A | 8/1927 | Wheeler et al. |
| 1,745,412 | A | 2/1930 | Fletcher |
| 1,765,338 | A | 6/1930 | Jones et al. |
| 2,061,564 | A | 11/1936 | Drake et al. |
| 2,063,301 | A | 12/1936 | Durdin, Jr. |
| 2,082,759 | A | 6/1937 | Walker |
| 2,116,023 | A | 5/1938 | Gwidt |

(Continued)

FOREIGN PATENT DOCUMENTS

| | | | |
|---|---|---|---|
| JP | 59-203694 | * | 11/1984 |

*Primary Examiner* — Charles S Bushey
(74) *Attorney, Agent, or Firm* — Albert W. Watkins

(57) ABSTRACT

An apparatus for treating fluids such as waste streams with improved aeration efficiency and dual function operation has a blower-assisted aerator, an impeller, a baffle structure circumscribing an air line that includes a first baffle and a second perforated baffle downstream from the first baffle, and a liquid reservoir containing a liquid. The impeller is fully submerged, and located upstream of the fully submerged baffle structure. A fully submerged air outlet is located downstream of the baffle structure, preferably in close proximity to the perforated baffle. When the blower is stopped and the impeller rotating, the baffle structure prevents aspiration into the liquid. In some embodiments, the baffle structure is removably affixed to an air outlet from the blower-assisted aerator, and so may be applied to pre-existing blower-assisted aerators. In some embodiments, one or both of the first and second baffles may resemble flat, domed, cupped, or hemispherical washers.

10 Claims, 3 Drawing Sheets

(56) References Cited

U.S. PATENT DOCUMENTS

| | | |
|---|---|---|
| 2,194,037 A | 3/1940 | Thuma |
| 2,232,388 A | 2/1941 | Ingalls et al. |
| 2,243,301 A | 5/1941 | Weinig |
| 2,313,654 A | 3/1943 | MacLean |
| 2,410,429 A | 11/1946 | Daman |
| 2,433,592 A | 12/1947 | Booth |
| 2,515,538 A | 7/1950 | Wall |
| 2,590,581 A | 3/1952 | Shirley |
| 2,609,097 A | 9/1952 | Dering |
| 2,641,455 A | 6/1953 | Poirot |
| 2,767,965 A | 10/1956 | Daman |
| 2,928,665 A | 3/1960 | Epprecht |
| 2,944,802 A | 7/1960 | Daman |
| 2,966,345 A | 12/1960 | Burgoon et al. |
| 3,053,390 A | 9/1962 | Wood |
| 3,092,678 A | 6/1963 | Braun |
| 3,108,146 A | 10/1963 | Gross |
| 3,191,394 A | 6/1965 | Avery et al. |
| 3,193,260 A | 7/1965 | Lamb |
| 3,202,281 A | 8/1965 | Weston |
| 3,210,053 A | 10/1965 | Boester |
| 3,235,234 A | 2/1966 | Beaudoin |
| 3,278,170 A | 10/1966 | Moritz |
| 3,342,331 A | 9/1967 | Maxwell |
| 3,365,178 A | 1/1968 | Bood |
| 3,400,918 A | 9/1968 | MacLaren |
| 3,411,706 A | 11/1968 | Woollenweber, Jr. et al. |
| 3,414,245 A * | 12/1968 | Frazer ............... B03D 1/1475 261/87 |
| 3,497,185 A | 2/1970 | Dively |
| 3,512,762 A | 5/1970 | Umbricht |
| 3,572,658 A | 3/1971 | Ravitts |
| 3,576,316 A | 4/1971 | Kaelin |
| 3,584,840 A | 6/1971 | Fuchs |
| 3,591,149 A | 7/1971 | Auler |
| 3,614,072 A | 10/1971 | Brodie |
| 3,620,512 A | 11/1971 | Muskat et al. |
| 3,640,514 A | 2/1972 | Albritton |
| 3,650,513 A | 3/1972 | Werner |
| 3,669,422 A | 6/1972 | Nogaj |
| 3,680,845 A | 8/1972 | Carlsmith et al. |
| 3,739,912 A | 6/1973 | Miller |
| 3,755,142 A | 8/1973 | Whipple |
| 3,768,788 A | 10/1973 | Candel |
| 3,775,307 A | 11/1973 | McWhirter et al. |
| 3,776,531 A | 12/1973 | Ebner et al. |
| 3,778,233 A | 12/1973 | Blough et al. |
| 3,782,702 A | 1/1974 | King |
| 3,794,303 A | 2/1974 | Hirshon |
| 3,797,809 A | 3/1974 | Sydnor |
| 3,829,070 A | 8/1974 | Reba et al. |
| 3,836,130 A | 9/1974 | Johnson et al. |
| 3,840,457 A | 10/1974 | Wilson |
| 3,846,292 A | 11/1974 | Le Compte, Jr. |
| 3,893,924 A | 7/1975 | Le Compte, Jr. et al. |
| 3,975,469 A | 8/1976 | Fuchs |
| 3,984,323 A | 10/1976 | Evens |
| 4,045,522 A | 8/1977 | Nafziger |
| 4,051,035 A | 9/1977 | Boschen et al. |
| 4,066,722 A | 1/1978 | Pietruszewski et al. |
| 4,070,279 A | 1/1978 | Armstrong |
| 4,145,383 A | 3/1979 | Randall |
| 4,169,047 A | 9/1979 | Wilson |
| 4,190,619 A | 2/1980 | Cherne |
| 4,193,951 A | 3/1980 | Stanley |
| 4,207,180 A | 6/1980 | Chang |
| 4,216,091 A | 8/1980 | Mineau |
| 4,240,990 A | 12/1980 | Inhofer et al. |
| 4,242,199 A | 12/1980 | Kelley |
| 4,268,398 A | 5/1981 | Shuck et al. |
| 4,279,753 A | 7/1981 | Nielson et al. |
| 4,280,911 A | 7/1981 | Durda et al. |
| 4,288,394 A | 9/1981 | Ewing et al. |
| 4,290,979 A | 9/1981 | Sugiura |
| 4,293,169 A | 10/1981 | Inhofer |
| 4,308,137 A | 12/1981 | Freeman |
| 4,308,138 A | 12/1981 | Woltman |
| 4,308,221 A | 12/1981 | Durda |
| 4,318,871 A | 3/1982 | Mentz |
| 4,334,826 A | 6/1982 | Connolly et al. |
| 4,350,589 A | 9/1982 | Stog |
| 4,350,648 A | 9/1982 | Watkins, III et al. |
| 4,409,100 A | 10/1983 | Rajendren |
| 4,431,597 A | 2/1984 | Cramer et al. |
| 4,443,338 A | 4/1984 | Reid |
| 4,468,358 A | 8/1984 | Haegeman |
| 4,540,528 A | 9/1985 | Haegeman |
| 4,587,064 A | 5/1986 | Blum |
| 4,676,654 A | 6/1987 | Fleckner |
| 4,732,682 A | 3/1988 | Rymal |
| 4,734,235 A | 3/1988 | Holyoak |
| 4,741,825 A | 5/1988 | Schiller |
| 4,741,870 A | 5/1988 | Gross |
| 4,774,031 A | 9/1988 | Schurz |
| 4,806,251 A | 2/1989 | Durda |
| 4,818,391 A | 4/1989 | Love |
| 4,842,732 A | 6/1989 | Tharp |
| 4,844,816 A | 7/1989 | Fuchs et al. |
| 4,844,843 A | 7/1989 | Endren |
| 4,882,099 A | 11/1989 | Durda et al. |
| 4,909,936 A | 3/1990 | Arbisi et al. |
| 4,954,295 A | 9/1990 | Durda |
| 4,975,197 A | 12/1990 | Wittmann et al. |
| 4,997,557 A | 3/1991 | Andersen |
| 5,011,631 A | 4/1991 | Hwang |
| 5,021,154 A | 6/1991 | Haegeman |
| 5,076,929 A | 12/1991 | Fuchs et al. |
| 5,078,923 A | 1/1992 | Durda et al. |
| 5,110,510 A | 5/1992 | Norcross |
| 5,116,501 A | 5/1992 | House |
| 5,122,266 A | 6/1992 | Kent |
| 5,160,620 A | 11/1992 | Lygren |
| 5,160,667 A | 11/1992 | Gross et al. |
| 5,185,080 A | 2/1993 | Boyle |
| 5,211,847 A | 5/1993 | Kanow |
| 5,213,718 A | 5/1993 | Burgess |
| 5,223,130 A | 6/1993 | Valfrido |
| 5,275,722 A | 1/1994 | Beard |
| 5,275,762 A | 1/1994 | Burgess |
| 5,300,261 A | 4/1994 | Von Berg |
| 5,312,567 A | 5/1994 | Kozma et al. |
| 5,314,525 A * | 5/1994 | Eckert ............... C21C 7/00 266/235 |
| 5,316,671 A | 5/1994 | Murphy |
| 5,326,459 A | 7/1994 | Hlavach et al. |
| 5,344,557 A | 9/1994 | Scanzillo |
| 5,354,457 A | 10/1994 | Becchi |
| 5,356,569 A | 10/1994 | Von Berg |
| 5,389,247 A | 2/1995 | Woodside |
| 5,421,999 A | 6/1995 | Poole et al. |
| 5,531,894 A | 7/1996 | Ball et al. |
| 5,545,327 A | 8/1996 | Volland |
| 5,554,291 A | 9/1996 | Scanzillo et al. |
| 5,582,734 A | 12/1996 | Coleman et al. |
| 5,707,562 A | 1/1998 | Karliner |
| 5,741,443 A | 4/1998 | Gemza |
| 5,744,072 A | 4/1998 | Karliner |
| 5,795,504 A | 8/1998 | Berchotteau |
| D401,547 S | 11/1998 | Karliner |
| 5,846,425 A | 12/1998 | Whiteman |
| 5,851,443 A | 12/1998 | Rajendren |
| 5,861,095 A | 1/1999 | Vogel et al. |
| 5,863,435 A | 1/1999 | Heijnen et al. |
| 5,868,091 A | 2/1999 | Gross et al. |
| 5,972,212 A | 10/1999 | Hongo |
| 5,988,604 A | 11/1999 | McWhirter |
| 5,996,977 A | 12/1999 | Burgess |
| 6,022,476 A | 2/2000 | Hausin |
| 6,050,550 A | 4/2000 | Burgess |
| 6,103,123 A | 8/2000 | Gantzer |
| 6,276,670 B1 | 8/2001 | Jacobs |
| 6,325,842 B1 | 12/2001 | Caldwell et al. |
| 6,328,289 B1 | 12/2001 | Becchi |
| 6,348,147 B1 | 2/2002 | Long |

(56) References Cited

U.S. PATENT DOCUMENTS

| | | | |
|---|---|---|---|
| 6,514,410 B1 | 2/2003 | Gantzer | |
| 6,821,426 B1 | 11/2004 | Hausin et al. | |
| 7,008,538 B2 | 3/2006 | Kasparian et al. | |
| 7,172,177 B2 | 2/2007 | Durda | |
| 7,431,272 B2 * | 10/2008 | Melen | B01F 3/04617 |
| | | | 261/123 |
| 7,465,394 B2 | 12/2008 | Durda et al. | |
| 7,661,658 B2 * | 2/2010 | Sun | B01F 27/25 |
| | | | 416/85 |
| 7,678,274 B2 | 3/2010 | Durda et al. | |
| 7,892,433 B2 | 2/2011 | Durda et al. | |
| 8,110,108 B2 | 2/2012 | Durda et al. | |
| 8,236,174 B2 | 8/2012 | Durda et al. | |
| 8,387,957 B2 * | 3/2013 | Johnson | B01F 33/503 |
| | | | 261/93 |
| 10,814,294 B1 * | 10/2020 | Huang | B01F 7/00341 |
| 2006/0151897 A1 * | 7/2006 | Melen | B01F 3/04617 |
| | | | 261/93 |

* cited by examiner

APPARATUS FOR TREATING FLUIDS HAVING IMPROVED AERATION EFFICIENCY AND DUAL FUNCTION OPERATION

CROSS REFERENCE TO RELATED APPLICATIONS

The present application claims the benefit of U.S. provisional patent application 62/861,442 filed Jun. 14, 2019 of like title and inventorship, the teachings and entire contents which are incorporated herein by reference.

BACKGROUND OF THE INVENTION

1. Field of the Invention

The present invention relates to an aerator for treatment of fluid. More particularly, the present invention relates to an air-assisted impeller aerator apparatus which efficiently mixes and selectively improves the dissolved oxygen content in a fluid.

2. Description of the Related Art

Aeration processes are utilized in the treatment of fluid for the purpose of mixing and increasing the dissolved oxygen (DO) content of the fluid. When used in a waste water treatment process, bacteria and other micro-organisms are supplied with dissolved oxygen to break down organic matter within the waste water in a purification process. In aquiculture applications, aeration processes are used in the treatment of water to meet the dissolved oxygen requirements for supporting fish and other aquatic organisms. There are many other applications where it is desirable to introduce air into a liquid. For yet other applications, a gas other than air may be introduced to meet a particular need or desire.

Known aeration apparatuses include surface aerators, blower/diffusers, rotor aerators, aspirator aerators, and blower-assisted aerators. Surface aerators pump water upward and throw the water into the air. Surface aeration systems consume high amounts of energy in pumping water against the force of gravity. In addition, the spraying of liquid into the air increases evaporation, and can lead to undesirable dissemination of odors into the atmosphere.

In blower/diffuser systems, compressed air is blown through diffusers at the bottom of a basin. Higher power is required to overcome the water head resistance, and the air rises vertically and escapes quickly before effective dissolution of the oxygen into the water can take place. In addition, when the diffuser requires service, the basin must be completely emptied, at least temporarily taking the basin out of service and reducing treatment capacity of the system.

Rotor aerators consist of rotating aerators positioned at the surface of the water receiving treatment. Rotor systems have been known to be expensive to maintain and are high in energy consumption. Similar to the surface aerator pumps, they cast water into the air, creating an aerosol environment which releases offending odors into the air.

Another known type of aeration apparatus is an aspirator type aerator. These devices use an electrical motor driven rotating impeller disposed below the surface of the substance being treated. The impeller moves the fluid being treated past a port coupled to atmospheric air through a draft tube. In doing so, the moving liquid generates sufficient suction to draw air into the tube and into the liquid being treated. Impeller type aerators may be operated generally horizontally, creating a horizontal rather than vertical flow pattern within a treatment basin. As may be appreciated, in these aspirator systems the impeller is designed to generate substantial suction, while still trying to preserve good mixing of the air or other gas into the liquid.

Blower-assisted impeller aerators use a blower to force air through a draft tube and into the liquid, while the impeller moves the liquid and facilitates thorough mixing between liquid and gas. Modern blower-assisted impeller aerators can have two modes, one in which there is no forced air added. Without the blower-assist, the impeller operates as a mixer to circulate the liquid undergoing treatment, without adding the gas. The second mode is forcing the air or other gas upstream or downstream of the impeller to mix a large quantity of oxygen or other gas into the liquid.

When blower-assisted propeller aerators operate without blower assist, they may act as an aspirator type aerator where the flow of water pulls air into the stream. This both decreases the mixing capacity of the system and in some applications very undesirably introduces oxygen during a treatment cycle during which no oxygen should be introduced. There are a number of treatment processes that alternate aeration cycles with oxygen-free mixing cycles. For exemplary and non-limiting purpose, denitrification and anaerobic conditions for biological phosphorus removal are two such situations where anoxic mixing is preferred.

Baffles have been added heretofore by the present assignee into aeration apparatus. These baffles help prevent aspiration during anoxic cycles. While the baffles prevent aspiration when used for mixing, the prior art baffles also have lower oxygenation efficiency when used with blower-assist than desired.

Aeration apparatus are a part of an industry that has been well-developed over the last four decades, with many advances made both by the present assignee and by others in the industry. Exemplary U.S. patents owned by the present assignee, the teachings and contents which are incorporated herein by reference, include: U.S. Pat. No. 4,240,990 by Inhofer et al, entitled "Aeration propeller and apparatus"; U.S. Pat. No. 4,280,911 by Durda et al, entitled "Method for treating water"; U.S. Pat. No. 4,293,169 by Inhofer, entitled "Water bearing"; U.S. Pat. No. 4,308,221 by Durda, entitled "Apparatus for mixing a gas and a liquid"; U.S. Pat. No. 4,409,100 by Rajendren, entitled "Liquid aerating device"; U.S. Pat. No. 4,741,825 by Schiller, entitled "Mobile vortex shield"; U.S. Pat. No. 4,774,031 by Schurz, entitled "Aerator"; U.S. Pat. No. 4,806,251 by Durda, entitled "Oscillating propeller type aerator apparatus and method"; U.S. Pat. No. 4,882,099 by Durda et al, entitled "Aeration apparatus having a deicing mechanism and control circuit therefor"; U.S. Pat. No. 4,954,295 by Durda, entitled "Propeller aerator with peripheral injection of fluid and method of using the aerator"; U.S. Pat. No. 5,078,923 by Durda et al, entitled "Aeration apparatus having a deicing mechanism and control circuit therefor"; U.S. Pat. No. 5,707,562 by Karliner, entitled "Turbo aerator"; U.S. Pat. No. 5,744,072 by Karliner, entitled "Method of treating waste water"; U.S. Pat. No. 7,172,177 by Durda, entitled "Aerator"; U.S. Pat. No. 7,465,394 by Durda et al, entitled "Wastewater treatment system"; U.S. Pat. No. 7,678,274 by Durda et al, entitled "Wastewater treatment system"; U.S. Pat. No. 7,892,433 by Durda et al, entitled "Wastewater treatment system"; U.S. Pat. No. 8,110,108 by Durda et al, entitled "Wastewater treatment system"; U.S. Pat. No. 8,236,174 by Durda et al, entitled "Wastewater treatment system"; and Des 401,547 by Karliner, entitled "Aerator float".

Other exemplary patents of varying relevance to aeration, the teachings and contents of each which are incorporated herein by reference, include: U.S. Pat. No. 1,343,797 by Stott et al, entitled "Aeration of sewage and other impure liquids"; U.S. Pat. No. 1,450,326 by Maitland, entitled "Apparatus for treating oils"; U.S. Pat. No. 1,505,479 by Maitland, entitled "Apparatus for treating oils"; U.S. Pat. No. 1,632,758 by Fulweiler et al, entitled "Process of purifying gas"; U.S. Pat. No. 1,639,828 by Wheeler et al, entitled "Process for treating cheese"; U.S. Pat. No. 1,745,412 by Fletcher, entitled "Aerator"; U.S. Pat. No. 1,765,338 by Jones et al, entitled "Agitator, aerator, and mixer"; U.S. Pat. No. 2,061,564 by Drake et al, entitled "Diffusion impeller deflector"; U.S. Pat. No. 2,063,301 by Durdin, Jr., entitled "Aerator"; U.S. Pat. No. 2,082,759 by Walker, entitled "Method and apparatus for treatment of sewage"; U.S. Pat. No. 2,116,023 by Gwidt, entitled "Aerator"; U.S. Pat. No. 2,194,037 by Thuma, entitled "Aerating device for liquids"; U.S. Pat. No. 2,232,388 by Ingalls et al, entitled "Froth flotation apparatus"; U.S. Pat. No. 2,243,301 by Weinig, entitled "Aeration apparatus"; U.S. Pat. No. 2,313,654 by MacLean, entitled "Apparatus for treating liquids with gases"; U.S. Pat. No. 2,410,429 by Daman, entitled "Agitation and aeration apparatus"; U.S. Pat. No. 2,433,592 by Booth, entitled "Aeration method and machine"; U.S. Pat. No. 2,515,538 by Wall, entitled "Water aerator, filter, and heater"; U.S. Pat. No. 2,590,581 by Shirley, entitled "Device for aerating water"; U.S. Pat. No. 2,609,097 by Dering, entitled "Flotation machine"; U.S. Pat. No. 2,641,455 by Poirot, entitled "Device which aerates water"; U.S. Pat. No. 2,767,965 by Daman, entitled "Dual pumping agitation"; U.S. Pat. No. 2,928,665 by Epprecht, entitled "Gas-liquid mixing apparatus"; U.S. Pat. No. 2,944,802 by Daman, entitled "Froth flotation and aeration apparatus"; U.S. Pat. No. 2,966,345 by Burgoon et al, entitled "Mixing apparatus"; U.S. Pat. No. 3,053,390 by Wood, entitled "Sewage treating apparatus"; U.S. Pat. No. 3,092,678 by Braun, entitled "Apparatus for gasifying liquids"; U.S. Pat. No. 3,108,146 by Gross, entitled "Fluid handling device"; U.S. Pat. No. 3,191,394 by Avery et al, entitled "Conservation arrangement and method"; U.S. Pat. No. 3,193,260 by Lamb, entitled "Apparatus for aerating and eliminating ice on water"; U.S. Pat. No. 3,202,281 by Weston, entitled "Method for the flotation of finely divided minerals"; U.S. Pat. No. 3,210,053 by Boester, entitled "Aerator structure"; U.S. Pat. No. 3,235,234 by Beaudoin, entitled "Apparatus for aerating water"; U.S. Pat. No. 3,278,170 by Moritz, entitled "Apparatus for placing gases and liquids into intimate contact"; U.S. Pat. No. 3,342,331 by Maxwell, entitled "Flotation machine"; U.S. Pat. No. 3,365,178 by Bood, entitled "Apparatus for agitating and aerating exposed bodies of water"; U.S. Pat. No. 3,400,918 by MacLaren, entitled "Sewage aerator"; U.S. Pat. No. 3,411,706 by Woollenweber, Jr. et al, entitled "Bearing durability enhancement device for turbocharger"; U.S. Pat. No. 3,497,185 by Dively, entitled "Aerating and cooling apparatus"; U.S. Pat. No. 3,512,762 by Umbricht, entitled "Apparatus for liquid aeration"; U.S. Pat. No. 3,572,658 by Ravitts, entitled "Floating aerator"; U.S. Pat. No. 3,576,316 by Kaelin, entitled "Apparatus for surface aeration and circulation of liquid"; U.S. Pat. No. 3,584,840 by Fuchs, entitled "Mixing device for introducing additives into a liquid"; U.S. Pat. No. 3,591,149 by Auler, entitled "Aeration apparatus"; U.S. Pat. No. 3,614,072 by Brodie, entitled "Hydraulic flow inducer"; U.S. Pat. No. 3,620,512 by Muskat et al, entitled "Aerating apparatus"; U.S. Pat. No. 3,640,514 by Albritton, entitled "Aeration"; U.S. Pat. No. 3,650,513 by Werner, entitled "Aeration device"; U.S. Pat. No. 3,669,422 by Nogaj, entitled "Aeration apparatus"; U.S. Pat. No. 3,680,845 by Carlsmith et al, entitled "Aerating apparatus and method"; U.S. Pat. No. 3,739,912 by Miller, entitled "Screening and aerating concentrator"; U.S. Pat. No. 3,755,142 by Whipple, entitled "Process and apparatus for the purification of a natural body of water"; U.S. Pat. No. 3,768,788 by Candel, entitled "Liquid aeration method and apparatus"; U.S. Pat. No. 3,775,307 by McWhirter et al, entitled "System for gas sparging into liquid"; U.S. Pat. No. 3,776,531 by Ebner et al, entitled "Apparatus and propeller for entraining fluids in liquids"; U.S. Pat. No. 3,778,233 by Blough et al, entitled "Apparatus for liquid composting"; U.S. Pat. No. 3,782,702 by King, entitled "Apparatus for mixing and treating fluids"; U.S. Pat. No. 3,794,303 by Hirshon, entitled "Method and apparatus for aerating bodies of water"; U.S. Pat. No. 3,797,809 by Sydnor, entitled "Aerator apparatus"; U.S. Pat. No. 3,829,070 by Imants et al, entitled "Gasification system"; U.S. Pat. No. 3,836,130 by Johnson et al, entitled "Liquid aerating apparatus"; U.S. Pat. No. 3,840,457 by Wilson, entitled "Method and apparatus for treating animal waste"; U.S. Pat. No. 3,846,292 by Le Compte, Jr., entitled "Ejector aerated oxidation ditch for waste treatment"; U.S. Pat. No. 3,893,924 by Le Compte, Jr. et al, entitled "Aerobic lagoon waste treatment system and method"; U.S. Pat. No. 3,975,469 by Fuchs, entitled "Device for revolving liquids and supplying gas thereto"; U.S. Pat. No. 3,984,323 by Evens, entitled "Apparatus for purifying polluted water"; U.S. Pat. No. 4,045,522 by Nafziger, entitled "Animal waste treatment system"; U.S. Pat. No. 4,051,035 by Boschen et al, entitled "Apparatus for the aerobic treatment of liquid waste"; U.S. Pat. No. 4,066,722 by Pietruszewski et al, entitled "Apparatus for sparging gas into liquid"; U.S. Pat. No. 4,070,279 by Armstrong, entitled "Eductor for dissolving gases in liquids"; U.S. Pat. No. 4,145,383 by Randall, entitled "Slurry aeration method and apparatus"; U.S. Pat. No. 4,169,047 by Wilson, entitled "Flotation machine with mixing and aeration impeller and method"; U.S. Pat. No. 4,190,619 by Cherne, entitled "Liquid aerating rotor assembly"; U.S. Pat. No. 4,193,951 by Stanley, entitled "Water aerating device"; U.S. Pat. No. 4,207,180 by Chang, entitled "Gas-liquid reaction method and apparatus"; U.S. Pat. No. 4,216,091 by Mineau, entitled "Water aerator"; U.S. Pat. No. 4,242,199 by Kelley, entitled "Aerator apparatus"; U.S. Pat. No. 4,268,398 by Shuck et al, entitled "Sludge agitating method"; U.S. Pat. No. 4,279,753 by Nielson et al, entitled "Wastewater treatment system including multiple stages of alternate aerobic-anaerobic bioreactors in series"; U.S. Pat. No. 4,288,394 by Ewing et al, entitled "Sewage aeration system"; U.S. Pat. No. 4,290,979 by Sugiura, entitled "Aeration apparatus"; U.S. Pat. No. 4,308,137 by Freeman, entitled "Water aeration and circulation apparatus"; U.S. Pat. No. 4,308,138 by Woltman, entitled "Treating means for bodies of water"; U.S. Pat. No. 4,318,871 by Mentz, entitled "Mounting ring construction for surface aerator apparatus"; U.S. Pat. No. 4,334,826 by Connolly et al, entitled "Surface aerator impeller"; U.S. Pat. No. 4,350,589 by Stog, entitled "Floating jet aerator"; U.S. Pat. No. 4,350,648 by Watkins III et al, entitled "Floating aerator"; U.S. Pat. No. 4,431,597 by Cramer et al, entitled "Horizontal mixing aerator"; U.S. Pat. No. 4,443,338 by Reid, entitled "Conversion of plug flow and complete mix aeration basins to barrier oxidation ditches"; U.S. Pat. No. 4,468,358 by Haegeman, entitled "Apparatus for mixing air and liquid"; U.S. Pat. No. 4,540,528 by Haegeman, entitled "Apparatus for mixing gas and liquid"; U.S. Pat. No. 4,587,064 by Blum, entitled "Aeration apparatus for large waters"; U.S. Pat. No. 4,676,654 by Fleckner, entitled "Agitator device"; U.S. Pat. No. 4,732,682 by Rymal, entitled "Aeration apparatus and method"; U.S. Pat. No. 4,734,235 by Holyoak, entitled "Aerator"; U.S. Pat. No. 4,741,870 by Gross, entitled "Apparatus for treatment of liquids"; U.S. Pat. No. 4,818,391 by Love, entitled "Integral Clarifier"; U.S. Pat. No. 4,842,732 by Tharp, entitled "Apparatus for aerating and mixing waste water"; U.S. Pat. No. 4,844,816 by Fuchs et al, entitled "Method of aeration at specific depth and pressure conditions"; U.S. Pat. No. 4,844,843 by Raj endren, entitled "Waste water aerator having rotating compression blades"; U.S. Pat. No. 4,909,936 by Arbisi et al, entitled "Water aerating system"; U.S. Pat. No. 4,975,197 by Wittmann et al, entitled "Orbal wastewater treatment process"; U.S. Pat. No. 4,997,557 by Andersen, entitled "Floating, mixing, aerating and decanting unit"; U.S. Pat. No. 5,011,631 by Hwang, entitled "Turbo jet aerator"; U.S. Pat. No. 5,021,154 by Haegeman, entitled "Mixer/aerator for waste water"; U.S. Pat. No. 5,076,929 by Fuchs et al, entitled "Sewage lagoon system"; U.S. Pat. No. 5,110,510 by Norcross, entitled "Aeration and mixing apparatus"; U.S. Pat. No. 5,116,501 by House, entitled "Paddlewheel aerator drive mechanism"; U.S. Pat. No. 5,122,266 by Kent, entitled "Apparatus for advanced aquaculture life support"; U.S. Pat. No. 5,160,620 by Lygren, entitled "Method and apparatus for treating water"; U.S. Pat. No. 5,160,667 by Gross et al, entitled "Bearing protection device for liquid aerators"; U.S. Pat. No. 5,185,080 by Boyle, entitled "Process for the on-site removal of nitrates from wastewater"; U.S. Pat. No. 5,211,847 by Kanow, entitled "Denitrification methods"; U.S. Pat. No. 5,213,718 by Burgess, entitled "Aerator and conversion methods"; U.S. Pat. No. 5,223,130 by Valfrido, entitled "Device for organic neutralization and removal of phosphorus compounds present in water basins"; U.S. Pat. No. 5,275,722 by Beard, entitled "Oxidation ditch wastewater treatment and denitrification system"; U.S. Pat. No. 5,275,762 by Burgess, entitled "Aerator"; U.S. Pat. No. 5,300,261 by Von Berg, entitled "Liquid aerating apparatus"; U.S. Pat. No. 5,312,567 by Kozma et al, entitled "Complex mixer for dispersion of gases in liquid"; U.S. Pat. No. 5,316,671 by Murphy, entitled "Submersible aeration train and aeration apparatus for biological purification of sewage"; U.S. Pat. No. 5,326,459 by Hlavach et al, entitled "Wastewater treatment apparatus"; U.S. Pat. No. 5,344,557 by Scanzillo, entitled "Incubator for biological cleaning of fluids"; U.S. Pat. No. 5,354,457 by Becchi, entitled "Water treatment equipment"; U.S. Pat. No. 5,356,569 by Von Berg, entitled "Liquid aerating apparatus"; U.S. Pat. No. 5,389,247 by Woodside, entitled "Waste water treatment process"; U.S. Pat. No. 5,421,999 by Poole et al, entitled "Floating nitrification reactor in a treatment pond"; U.S. Pat. No. 5,531,894 by Ball et al, entitled "Method of treating wastewater"; U.S. Pat. No. 5,545,327 by Volland, entitled "Wastewater treatment method and apparatus"; U.S. Pat. No. 5,554,291 by Scanzillo et al, entitled "Methods and apparatus for biodegradation of polluted fluids"; U.S. Pat. No. 5,582,734 by Coleman et al, entitled "Oxidation ditch modification and automated control system for nitrogen removal and sludge settling improvements"; U.S. Pat. No. 5,741,443 by Gemza, entitled "Oxygenation of stratified water"; U.S. Pat. No. 5,795,504 by Berchotteau, entitled "Apparatus for feeding and diffusing air or another gas into a liquid"; U.S. Pat. No. 5,846,425 by Whiteman, entitled "Methods for treatment of waste streams"; U.S. Pat. No. 5,851,443 by Rajendren, entitled "Aerator with dual path discharge"; U.S. Pat. No. 5,861,095 by Vogel et al, entitled "Method and device for treating wastewater"; U.S. Pat. No. 5,863,435 by Heijnen et al, entitled "Biological treatment of wastewater"; U.S. Pat. No. 5,868,091 by Gross et al, entitled "Float mounted aerator having a work deck"; U.S. Pat. No. 5,972,212 by Hongo, entitled "Apparatus for treating organic waste water utilizing microorganisms"; U.S. Pat. No. 5,988,604 by McWhirter, entitled "Mixing impellers especially adapted for use in surface aeration"; U.S. Pat. No. 5,996,977 by Burgess, entitled "Temperature adjusted water aerator and circulation system"; U.S. Pat. No. 6,022,476 by Hausin, entitled "Water treatment process"; U.S. Pat. No. 6,050,550 by Burgess, entitled "Apparatus for aeration and bottom agitation for aqua-culture systems"; U.S. Pat. No. 6,103,123 by Gantzer, entitled "Aeration device and method for creating and maintaining facultative lagoon"; U.S. Pat. No. 6,276,670 by Jacobs, entitled "Combined mixer-aerator"; U.S. Pat. No. 6,325,842 by Caldwell et al, entitled "Method and apparatus for aerating"; U.S. Pat. No. 6,328,289 by Becchi, entitled "Device for treating water in a basin"; U.S. Pat. No. 6,348,147 by Long, entitled "Fluid flow system for floating biological contactor"; U.S. Pat. No. 6,514,410 by Gantzer, entitled "Odor control apparatus for facultative lagoon"; U.S. Pat. No. 6,821,426 by Hausin et al, entitled "Process for treating a body of water"; and U.S. Pat. No. 7,008,538 by Kasparian et al, entitled "Single vessel multi-zone wastewater bio-treatment system".

In addition to the foregoing patents, Webster's New Universal Unabridged Dictionary, Second Edition copyright 1983, is incorporated herein by reference in entirety for the definitions of words and terms used herein.

In spite of the enormous advancements and substantial research and development that has been conducted in the field of blower-assisted aerators, there still remains a need for a more efficient blower-assisted aerator that is capable of dual mode operation.

SUMMARY OF THE INVENTION

In a first manifestation the invention is, in combination, a blower-assisted aerator, an impeller, a baffle structure, and a liquid reservoir containing a liquid. The blower-assisted aerator has: a motor rotating the impeller, the impeller fully submerged within and thereby impelling the liquid; an air line having an air line outlet submerged in the liquid and distal to the motor and an air line inlet relatively more adjacent to the motor than the air line outlet; and a blower having a blower air inlet and an air outlet, the blower forcing air from the blower inlet into the air line inlet and through the air line to the air line outlet. The baffle structure has: a first disc-shaped baffle downstream from and co-axially aligned with the impeller and fully submerged within the liquid having a first baffle outer diameter; a second disc-shaped baffle fully submerged within the liquid and located downstream from and co-axially aligned with the impeller and more distal thereto than the first baffle, the second baffle having a first major surface, a second major surface separated from the first major surface by a thickness, and a second baffle outer diameter greater than the first baffle outer diameter, the second baffle further having a plurality of perforations passing from the first major surface through the thickness to the second major surface.

In a second manifestation, the invention is a baffle structure configured to affix to an air outlet of a blower-assisted impeller aerator downstream from an impeller of the blower-assisted impeller aerator. A first baffle has a first baffle inner diameter, a first baffle outer diameter, and a first baffle thickness therebetween. A second baffle is co-axially aligned with the first baffle and has a second baffle inner diameter, a second baffle outer diameter, and a second baffle thickness therebetween, a second baffle first major surface, a second baffle second major surface separated from the second baffle first major surface by a second baffle thickness, and a second baffle outer diameter greater than the first baffle outer diameter. The second baffle further has a plurality of perforations passing from the second baffle first major surface through the second baffle thickness to the second baffle second major surface that are configured to pass at least a portion of a liquid flow impelled by the blower-assisted impeller aerator and downstream from the first baffle through the plurality of perforations.

OBJECTS OF THE INVENTION

Exemplary embodiments of the present invention solve inadequacies of the prior art by providing an apparatus for treating fluids having improved aeration efficiency and dual function operation. The apparatus has a baffle structure circumscribing an air line 10 that includes a first baffle and a second perforated baffle. An impeller is located upstream of the baffle structure, and an air outlet 14 is located downstream of the baffle structure, preferably in close proximity to the perforated baffle.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a blower-assisted aeration apparatus for treating fluids that has improved aeration efficiency. A second object of the invention is to maintain dual function operation, enabling the blower-assisted aeration apparatus to continuously mix a liquid while selectively either introducing air into the liquid or operating anoxically. Another object of the present invention is to minimally alter existing equipment, preferably facilitating both new product sales and upgrades to existing aeration apparatuses. A further object of the invention is to provide such an apparatus that maintains a high degree of reliability, and does not deleteriously affect operation of the blower-assisted aeration unit even in the event of lack of maintenance that may lead to a loss of the improved aeration efficiency. Yet another object of the present invention is to require very nominal, if any, additional maintenance with the improved apparatus.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
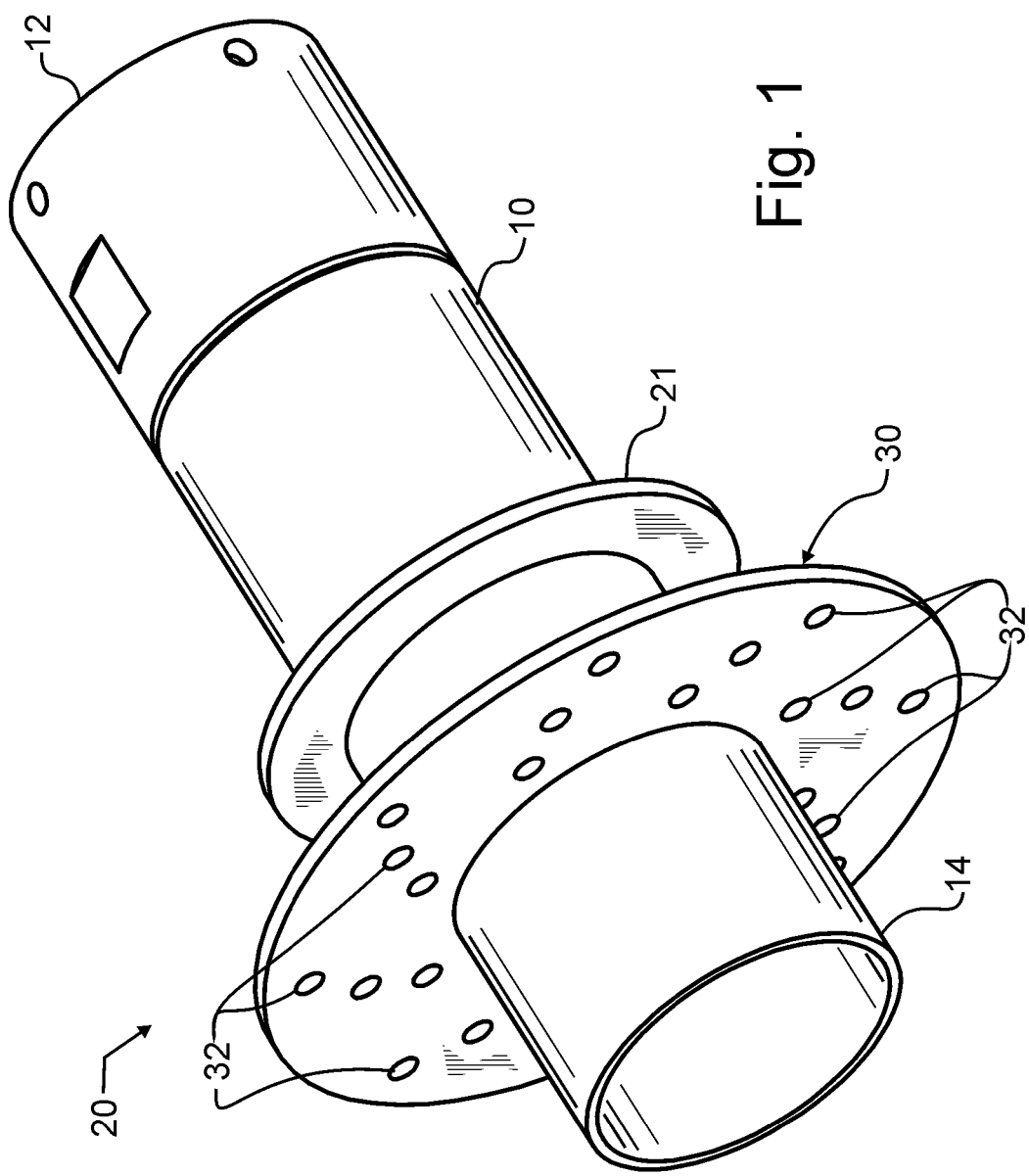
FIGS. 1-3 illustrates a preferred embodiment perforated baffle designed in accord with the teachings of the present invention from isometric, top, and bottom views, respectively.
Figure 2:
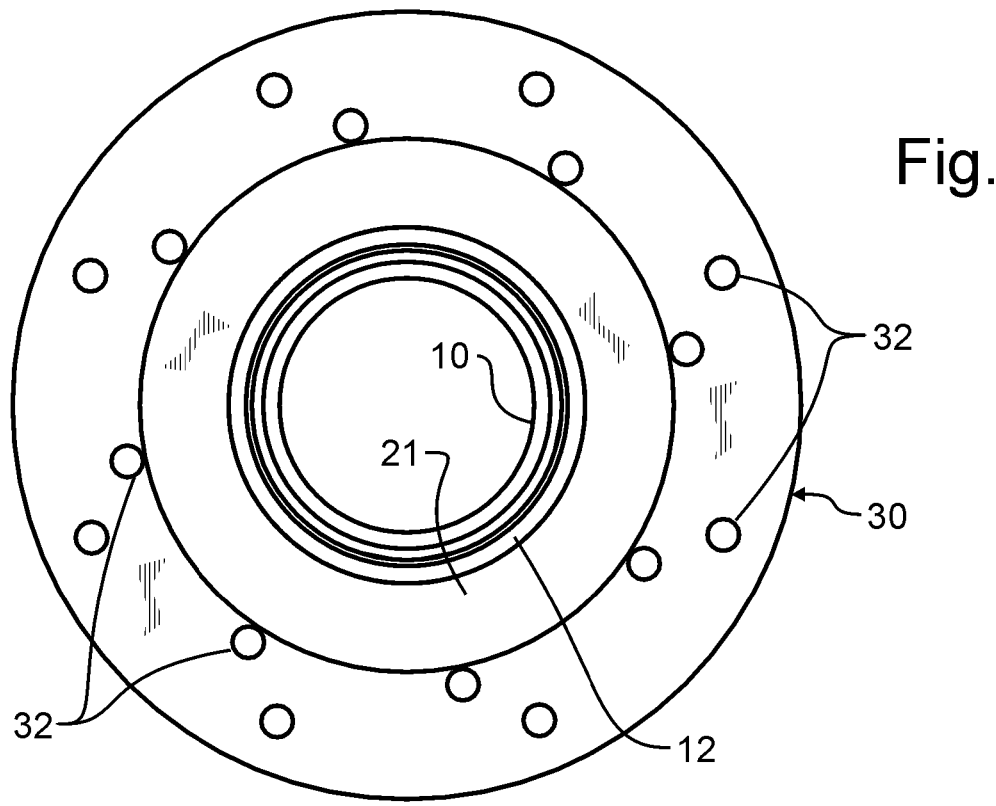
Figure 3:
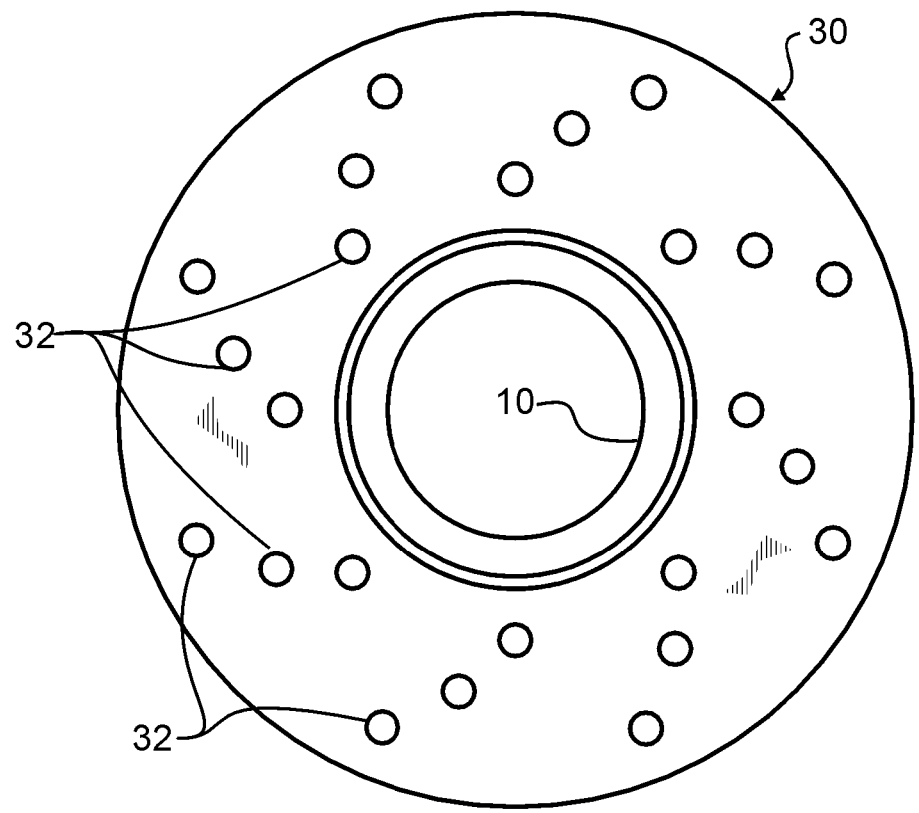

To improve the efficiency of blower-assisted impeller aerators, a baffle structure 20 visible in the Figures may replace a pre-existing baffle structure, or may be appended to many existing air outlet structures that lack baffles. A preferred embodiment baffle structure 20 as illustrated in FIGS. 1-3 is comprised of an air line 10, a baffle structure air inlet 12 coupled to a first end of air line 10, a baffle structure air outlet 14 defining a second end of air line 10 distal to baffle structure air inlet 12, a first baffle 21, and a second perforated baffle 30. Baffles 21, 30 each have a geometry resembling a large washer, generally flat with a smaller diameter circular hole that circumscribes air line 10 and a larger diameter circular outer perimeter.

Perforated baffle 30 is both of greater outer diameter than baffle 21, and additionally has a plurality of perforations 32 that spiral with increasing radial distance from air line 10. This arrangement of perforations 32 is most preferred. In some alternative embodiments, only one ring of perforations 32 are provided. In some alternative embodiments, perforations 32 have a rectangular parallelepiped outline. In other alternative embodiments, perforations 32 comprise slots that extend entirely within the radial extent of the baffle. In yet other alternative embodiments, perforations 32 comprise slots or holes that form a portion of the outer, the inner, or even both perimeters of the baffle. In yet further alternative embodiments, baffle 21 is provided with perforations of any suitable geometry. In other alternative embodiments, perforations 32 may be of other geometries, and at any location(s) throughout perforated baffle 30.

While solid baffles have heretofore been used with blower-assisted impeller aerators, surprisingly they do not provide as much oxygenation efficiency as obtained with perforated baffle 30. This is particularly surprising and unexpected, since the prior art solid baffle creates greater shear at the outer diameter than provided by the preferred embodiment.

One particularly important consideration in the design and construction of baffles 21, 30 is that they still provide sufficient flow alteration that, when a blower-assist is provided, air is not aspirated out of air outlet 14. Consequently, in a most preferred embodiment, baffles 21, 30 will still provide sufficient and appropriate flow and turbulence in the area immediately adjacent to the perforated baffle 30 and air outlet 14 to prevent the blower-assisted propeller aerator to aspirate, while otherwise improving oxygenation efficiency into the fluid when air is blown out of air outlet 14.

While preferred embodiment baffle structure 20 is comprised of two baffles 21, 30, in alternative embodiments fewer or more baffles which may or may not be segmented along air line 10 may be provided, and perforations may be provided on some or all of these baffles. Having segmented baffles may achieve the desired turbulence to limit aspiration and thereby aid mixing, while also encouraging mixing of oxygen or other gas into the fluid during periods of blower assist.

Some fluids being treated have inherently high levels of debris and contamination that might prematurely clog the perforations 32, 34. When the present invention is applied to such fluids, in some alternative embodiments the geometry of baffles 21, 30 will be further modified to reduce any tendency for such clogging. In one such alternative embodiment, presented herein for exemplary purposes only and not limiting the present invention solely thereto, one or more of the baffles 21, 30 may be non-planar, taking on a cupped, domed, conical, or other suitable geometry. Again for exemplary and non-limiting purpose, in one alternative embodiment this may take the general form resembling a hemisphere, with the outer diameter of the baffle corresponding to the equator, and the inner diameter of the baffle corresponding to the pole of the hemisphere. In another alternative embodiment, the baffle may be conical. In these alternative embodiments, by keeping the outer diameter of the baffle more nearly adjacent to air outlet 14, the baffle will tend to shed debris that might otherwise catch or accumulate on the baffle or within baffle perforations 32.

In those cases where a baffle such as baffles 21, 30 is both non-planar and includes perforations 32, the perforations in some embodiments will pass through the baffle in a direction offset from the longitudinal axis of air line 10. In those embodiments, fluid being driven past the baffle by an impeller will tend to wash away debris, thereby self-cleaning perforations 32 from larger debris. Nevertheless, it will be appreciated that for many applications the fluid driven by a closely located impeller 40 in combination with the intrinsic flow alteration of liquid 6 adjacent to the baffles will in most cases eliminate any need for non-planar baffles.

Figure 4:
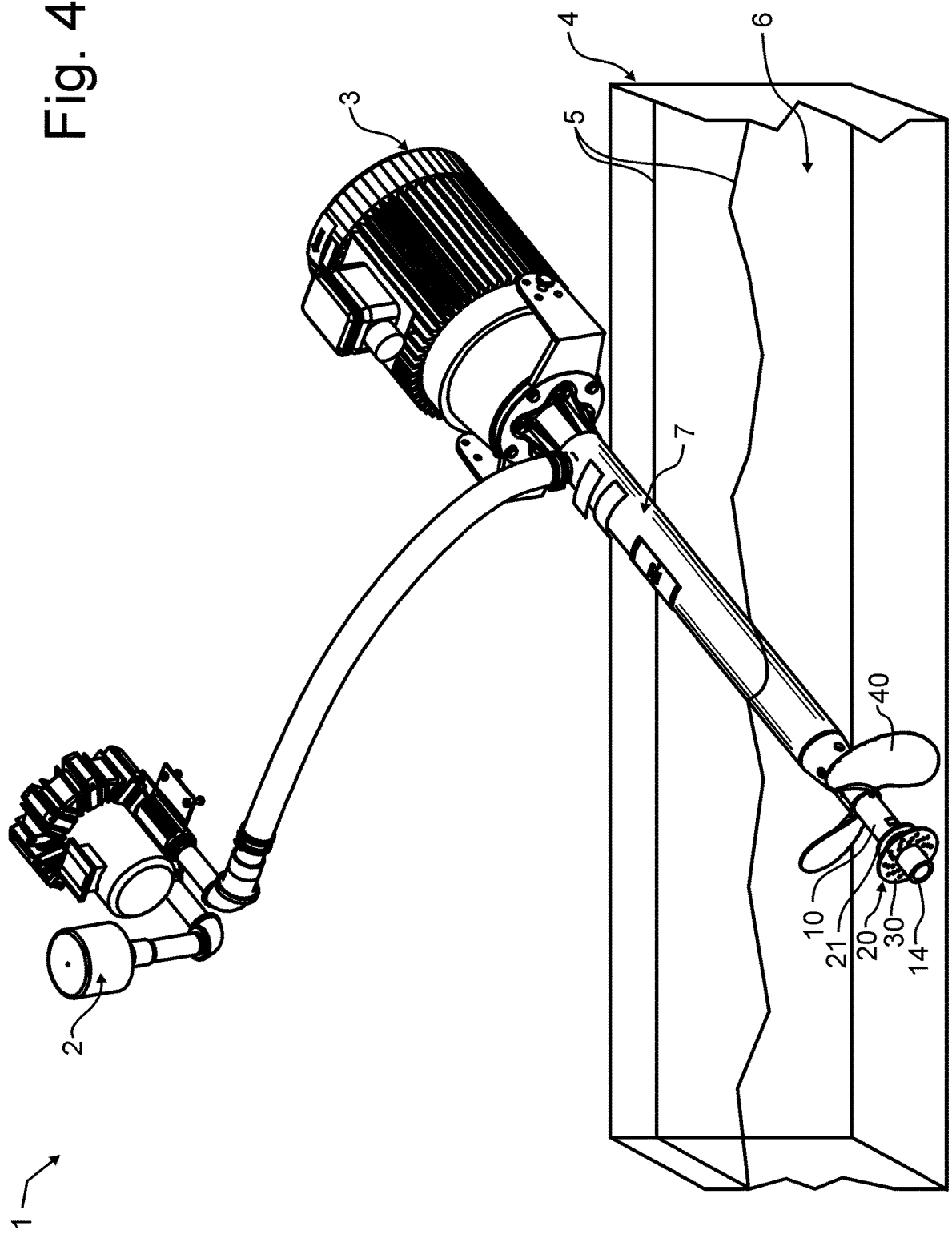
FIG. 4 illustrates a preferred embodiment apparatus for treating fluids having improved aeration efficiency and dual function operation designed in accord with the teachings of the present invention in combination with a liquid reservoir and a liquid undergoing treatment from an isometric view.

The present invention provides an aeration apparatus 1 for treating fluids that has both improved aeration efficiency and dual function operation. FIG. 4 illustrates a preferred combination blower-assisted impeller aerator and preferred embodiment baffle structure 20. In this preferred combination, a blower 2 draws air from the environment and forces air into air line 7. Baffle structure air inlet 12 is coupled to air line 7 distal to motor 3, using any suitable coupling or fastening technique. Air passing from air line 7 will pass through baffle structure air inlet 12 and baffle structure air line 10, ultimately passing out of air outlet 14. A motor 3 imparts rotary motion in impeller 40, located upstream of baffle structure 20 and typically adjacent to baffle structure air inlet 12.

In preferred embodiment aeration apparatus 1 for treating fluids that has both improved aeration efficiency and dual function operation, both impeller 40 and air outlet 14 are fully submerged within a liquid 6 being treated. Liquid 6 defines a water line 5 within reservoir 4. Reservoir 4 may be of any size and geometry suitable to accommodate preferred embodiment aeration apparatus 1. While motor 3 may in some alternative embodiments be fully submerged within liquid 6, as could all but the air inlet for blower 2, such submersion undesirably complicates both installation and maintenance.

Preferably, when blower 2 is turned off, air does not aspirate through blower 2 and air line 10 to outlet 14. Instead, the preferred combination blower-assisted impeller aerator and impeller will operate as a mixer when blower 2 is off. A baffle structure 20 configured to improve oxygenation efficiency while preventing the aforementioned aspiration when blower 2 is off preferably comprises a first baffle 21 and a second perforated baffle 30.

From the foregoing figures and description, several additional features and options become more apparent. First of all baffle structure 20 may be manufactured from a variety of materials, including metals, resins and plastics, ceramics, or even combinations, laminates, or composites of the above. The specific material used may vary, though special benefits are attainable if several important factors are taken into consideration. The preferred material to manufacture baffle structure 20 is stainless steel due to excellent durability and corrosion and chemical resistance. Further, a lack of porosity facilitates cleaning with a stream of high pressure water. Nevertheless, in alternative embodiments the use of resins, plastics, or ceramics enables the shaping of the baffle structure 20 at relatively lower cost when compared to stainless steel. As may be appreciated for the preferred applications, it is preferable that all materials that may be incorporated are sufficiently tough and durable to not fracture or stress, even when great forces are applied thereto.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. In combination, a blower-assisted aerator, an impeller, a baffle structure, and a liquid reservoir containing a liquid, said blower-assisted aerator having:
    a motor rotating said impeller, said impeller fully submerged within and thereby impelling said liquid;
    an air line having an air line outlet submerged in said liquid and distal to said motor and an air line inlet relatively more adjacent to said motor than said air line outlet; and
    a blower having a blower air inlet and an air outlet, said blower forcing air from said blower inlet into said air line inlet and through said air line to said air line outlet;
said baffle structure having:
    a first disc-shaped baffle downstream from and co-axially aligned with said impeller and fully submerged within said liquid having a first baffle outer diameter;
    a second disc-shaped baffle fully submerged within said liquid and located downstream from and co-axially aligned with said impeller and more distal thereto than said first baffle, said second baffle having a first major surface, a second major surface separated from said first major surface by a thickness, and a second baffle outer diameter greater than said first baffle outer diameter, said second baffle further having a plurality of perforations passing from said first major surface through said thickness to said second major surface.

2. The combination blower-assisted aerator, impeller, and liquid reservoir of claim 1, wherein said baffle structure further comprises:
    a baffle structure air inlet coupled to said air line outlet and receiving blower-forced air therefrom;
    a baffle structure air line coupled to said baffle structure air inlet and receiving blower-forced air therefrom and having a baffle structure air outlet distal to said baffle structure air inlet and fully submerged within said liquid;
    wherein said first disc-shaped baffle and said second disc-shaped baffle each circumscribe said baffle structure air line.

3. The combination blower-assisted aerator, impeller, and liquid reservoir of claim 2, wherein said second baffle plurality of perforations spiral with increasing radial distance from said baffle structure air line.

4. The combination blower-assisted aerator, impeller, and liquid reservoir of claim 1, wherein said first and second disc-shaped baffles prevent aspiration of air through said air line when said impeller is rotating and said blower is inactive.

5. The combination blower-assisted aerator, impeller, and liquid reservoir of claim 2, wherein said plurality of perforations each have longitudinal axes that are axially offset from a longitudinal axis of said air line.

6. A baffle structure configured to affix to an air outlet of a blower-assisted impeller aerator downstream from an impeller of said blower-assisted impeller aerator, comprising:

a first baffle having a first baffle inner diameter, a first baffle outer diameter, and a first baffle thickness therebetween;

a second baffle co-axially aligned with said first baffle and having a second baffle inner diameter, a second baffle outer diameter, and a second baffle thickness therebetween, a second baffle first major surface, a second baffle second major surface separated from said second baffle first major surface by a thickness, and a second baffle outer diameter greater than said first baffle outer diameter, said second baffle further having a plurality of perforations passing from said second baffle first major surface through said second baffle thickness to said second baffle second major surface and configured to pass at least a portion of a liquid flow impelled by said blower-assisted impeller aerator and downstream from said first baffle through said plurality of perforations.

7. The baffle structure of claim 6, further comprising:

a baffle structure air inlet configured to couple to and receive blower-forced air from said air outlet of said blower-assisted impeller aerator downstream from said impeller;

a baffle structure air line coupled to said baffle structure air inlet and receiving blower-forced air therefrom and having a baffle structure air outlet distal to said baffle structure air inlet configured to be fully submerged within said impelled liquid flow;

wherein said first disc-shaped baffle and said second disc-shaped baffle each circumscribe said baffle structure air line.

8. The baffle structure of claim 7, wherein said second baffle plurality of perforations spiral with increasing radial distance from said baffle structure air line.

9. The baffle structure of claim 6, wherein said first and second disc-shaped baffles are configured to prevent aspiration of air through said air outlet when said impeller is rotating and a blower configured to generate said blower-force air is inactive.

10. The baffle structure of claim 7, wherein said plurality of perforations each have longitudinal axes that are axially offset from a longitudinal axis of said air line.

* * * * *